United States Patent
Ichinose et al.

(10) Patent No.: US 10,207,736 B2
(45) Date of Patent: Feb. 19, 2019

(54) STEERING CONTROL DEVICE FOR WORKING VEHICLE

(71) Applicant: Hitachi Construction Machinery Co., Ltd., Taito-ku, Tokyo (JP)

(72) Inventors: Masanori Ichinose, Tsukuba (JP); Shinjiro Saito, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/553,212

(22) PCT Filed: Oct. 5, 2015

(86) PCT No.: PCT/JP2015/078235
§ 371 (c)(1),
(2) Date: Aug. 24, 2017

(87) PCT Pub. No.: WO2017/060958
PCT Pub. Date: Apr. 13, 2017

(65) Prior Publication Data
US 2018/0037257 A1    Feb. 8, 2018

(51) Int. Cl.
*B62D 6/10*    (2006.01)
*B62D 5/04*    (2006.01)
(Continued)

(52) U.S. Cl.
CPC ............... *B62D 6/10* (2013.01); *B62D 5/04* (2013.01); *B62D 5/0463* (2013.01); *B62D 6/00* (2013.01);
(Continued)

(58) Field of Classification Search
CPC .......... B62D 6/10; B62D 5/04; B62D 5/0463; B62D 6/00; G01L 5/221; H02P 27/06; H02P 2205/05
See application file for complete search history.

(56) References Cited

U.S. PATENT DOCUMENTS 5,469,356 A    11/1995  Hawkins et al.
2005/0039971 A1*   2/2005  Fujioka ................. B62D 5/006
                                                  180/402
(Continued)

FOREIGN PATENT DOCUMENTS

JP    50-33584 B    10/1975
JP    8-76846 A    3/1996
(Continued)

OTHER PUBLICATIONS

International Search Report (PCT/ISA/210) issued in PCT Application No. PCT/JP2015/078235 dated Dec. 28, 2015 with English translation (5 pages).
(Continued)

*Primary Examiner* — Tony H Winner
*Assistant Examiner* — Marlon A Arce
(74) *Attorney, Agent, or Firm* — Crowell & Moring LLP

(57) ABSTRACT

A steering control device (20) for a working vehicle includes an electric motor device (34) that generates an assistance torque to a steering column (33), and an inverter (43). The steering control device (20) includes a load torque sensor (39) that is attached between the electric motor device (34) and a load portion of a steering mechanism unit (21) to detect a load torque applied on a steering system, a steering load torque calculating section (41) that calculates a steering load torque based upon an output value of the load torque sensor (39), and an assistance torque calculating section (42) that adds the steering load torque outputted from the steering load torque calculating section (41) and a target steering torque input from an exterior to calculate an assistance torque to command the electric motor device (34) and command the inverter (43).

3 Claims, 11 Drawing Sheets

(51) Int. Cl.
　　　*B62D 6/00*　　　(2006.01)
　　　*G01L 5/22*　　　(2006.01)
　　　*H02P 27/06*　　　(2006.01)

(52) U.S. Cl.
　　　CPC .............. *G01L 5/221* (2013.01); *H02P 27/06* (2013.01); *H02P 2205/05* (2013.01)

(56) References Cited

U.S. PATENT DOCUMENTS

| | | | | |
|---|---|---|---|---|
| 2006/0011404 | A1* | 1/2006 | Goto | B62D 6/002 |
| | | | | 180/402 |
| 2008/0164087 | A1* | 7/2008 | Koyama | B62D 6/008 |
| | | | | 180/402 |
| 2009/0024278 | A1 | 1/2009 | Kondo et al. | |
| 2012/0197496 | A1 | 8/2012 | Limpibunterng et al. | |
| 2013/0220725 | A1* | 8/2013 | Ishihara | B62D 5/003 |
| | | | | 180/402 |

FOREIGN PATENT DOCUMENTS

| | | |
|---|---|---|
| JP | 2005-170257 A | 6/2005 |
| JP | 2006-264405 A | 10/2006 |
| JP | 2011-79410 A | 4/2011 |

OTHER PUBLICATIONS

Japanese-language Written Opinion (PCT/ISA/237) issued in PCT Application No. PCT/JP2015/078235 dated Dec. 28, 2015 (5 pages).

* cited by examiner

STEERING CONTROL DEVICE FOR WORKING VEHICLE

TECHNICAL FIELD

The present invention relates to a steering control device for a working vehicle represented by a dump truck, for example.

BACKGROUND ART

In general, an automobile including a working vehicle is provided thereon with an electric power steering device having an electric motor in a steering column or in a rack (Patent Document 1). The electric motor supplements a force required for a handle operation (steering) of a vehicle to lighten fatigue of an operator. This type of power steering devices according to the conventional technology is provided with a manual steering device that changes a direction of steering wheels in response to the handle operation of the operator. This steering device is provided with a torque sensor that is arranged in the middle of the steering column between a handle and a load portion of a steering mechanism to detect a steering torque by the operator, and an electric motor that generates an assistance torque for assisting in a steering torque that changes the direction of the steering wheels.

Here, the electric motor does not rotate as long as the handle is not operated by the operator, and the assistance torque by the electric motor is not outputted. In addition, the electric motor is controlled in a motor rotation such that as a detection torque by the torque sensor is the larger, the assistance torque can be made the larger. That is, the load torque applied on a steering system changes depending upon a road surface state such as slipperiness of a road surface. Therefore, in the conventional electric power steering device, the steering torque required for the operator to be applied on the handle varies. Accordingly, as the load torque becomes the larger, the steering torque (a steering feeling as a steering reaction of the operator) becomes the larger.

In this way, in vehicles such as the automobile running on a general road, a characteristic in which the steering torque changes depending upon the aforementioned road surface is sometimes used as a means for recognizing the road surface state. That is, the operator can recognize the state of the road from the operating feeling (steering feeling as the steering reaction) of the handle, which makes it possible to drive and steer with a resistant operating feeling during vehicle traveling.

PRIOR ART DOCUMENTS

Patent Documents

Patent Document 1: Japanese Examined Patent Publication No. Sho 50-33584 B
Patent Document 2: Japanese Patent Laid-Open No. Hei 8-76846 A

SUMMARY OF THE INVENTION

Incidentally, in a working vehicle represented by a dump truck that transports crushed objects or sand and earth dug in a large-sized digging site of amine or the like, in a quarry and the like, a steering operation by an operator is performed frequently and for a long time. Therefore, there is a need of reducing a steering torque (a steering feeling as a steering reaction) necessary for the handle operation of the operator to be as small as possible. That is, the working vehicle of the dump truck or the like only repeatedly travels in a relatively slow speed on a road having a predetermined road surface state even if a working site is an uneven road or the like. Therefore, there are a few cases where the steering torque is affected by a change of the road surface state, and rather, it is desired that the steering torque can be always made light.

There is known, as described in Patent Document 2, such a working vehicle that has an autonomous mode of autonomously traveling based upon various commands by a remote operation from an exterior and a manual mode of traveling by a manual operation (steering) by a boarded operator. Any one mode of the autonomous and manual modes is selected by a mode selection signal to perform a traveling movement.

An object of the present invention is to provide a steering control device in a large-sized working vehicle represented by a dump truck, for example, that can perform a remote operation from an exterior or a steering operation by an operator with a light steering force due to generation of an appropriate assistance steering force thereto.

For solving the aforementioned problems, a steering control device according to the present invention includes an electric motor device that generates an assistance torque to a steering column of a steering mechanism for a working vehicle, and an inverter that supplies a current for driving the electric motor device based upon a command value of the assistance torque, characterized by including a load torque sensor that is attached between the electric motor device and a load portion of the steering mechanism to detect a load torque applied on a steering system, a steering load torque calculating section that calculates a steering load torque based upon an output value of the load torque sensor, and an assistance torque calculating section that adds the steering load torque outputted from the steering load torque calculating section and a target steering torque input from an exterior to calculate the assistance torque to command the electric motor device and command the inverter.

According to the present invention, in the working vehicle, particularly in a vehicle of a dump truck or the like, the steering load torque generated by the steering operation by an operator is detected by the load torque sensor, and the assistance torque is calculated based upon the output value of the detected torque, driving the electric motor device. Thereby, an appropriate supplemental steering force (assistance torque) is generated, making it possible to always perform the operation with a light steering force. Therefore, a reduction in fatigue of the operator is made possible. In addition, in a case of the working vehicle where an alternative function of the steering operation by the operator is added to make it possible to perform an automatic steering by the autonomous mode, the assistance torque is calculated based upon the steering torque command value from the external control device and the steering load torque to drive the electric motor device. Thereby, it is possible to generate the supplemental steering force to cancel out the steering load torque to realize the steering control device allowing the automatic steering operation to smoothly follow up the steering torque command value.

MODE FOR CARRYING OUT THE INVENTION

Hereinafter, a steering control device for a working vehicle according to an embodiment of the present invention will be in detail explained with reference to the accompanying drawings, by taking a case of being applied to a dump truck as an example.

FIG. 1 to FIG. 10 show a steering control device for a working vehicle according to a first embodiment of the present invention.

Figure 1:
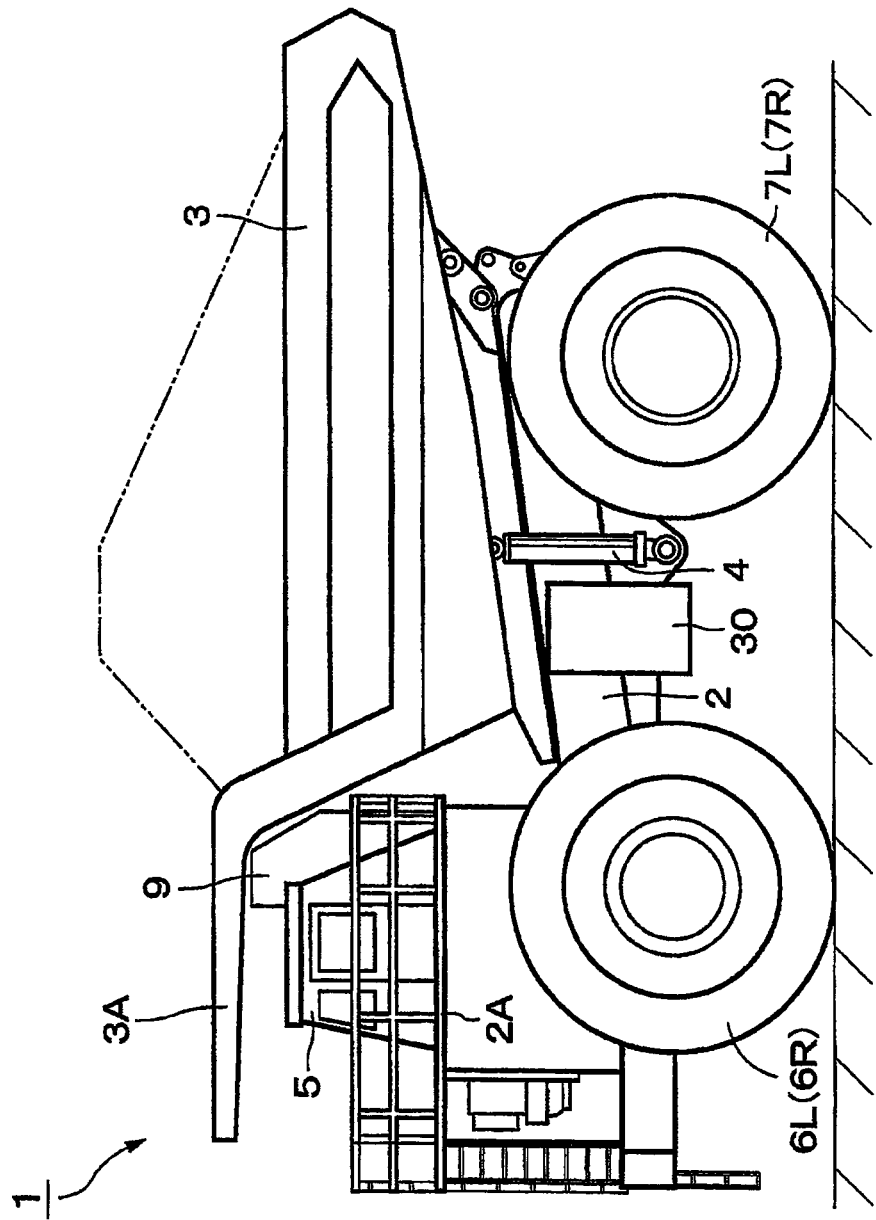
FIG. 1 is a front view showing a dump truck as a working vehicle according to an embodiment in the present invention.

In FIG. 1, a dump truck 1 is a large-sized working vehicle that transports crushed objects or sand and earth dug in a large-sized digging site of a mine or the like, in a quarry and the like. The dump truck 1 includes a vehicle body 2, a vessel 3, a cab 5, front wheels 6L and 6R, rear wheels 7L and 7R, and the like. The vehicle body 2 forms part of a frame structure of the dump truck 1. The vessel 3 as a loading platform is mounted on an upper side of the vehicle body 2 to be capable of being tilted (lifted) on a basis of a rear side as a fulcrum by a hoist cylinder 4.

A deck part 2A is provided in a front side of the vehicle body 2 in a position of an under side of a protector 3A of the vessel 3. The cab 5, a motor control device 9 and the like are mounted on the deck part 2A. The cab 5 is provided on an upper side of the vehicle body 2 (deck part 2A) to be located in the front side of the vessel 3. Within the cab 5, an accelerator pedal 10, a brake pedal 11, a steering handle 32 to be described later and the like are provided. An engine (not shown) as a prime mover is provided in the vehicle body 2 to be located under the cab 5, for example. The engine is configured of a large-sized diesel engine, for example.

Left and right front wheels 6L and 6R form part of steering wheels a steering angle of which is variably controlled by steering cylinders 27L, 27R to be described later. The left and right front wheels 6L and 6R are operated to be steered by an extending movement and a contracting movement of the steering cylinders 27L and 27R when an operator of the dump truck 1 operates the steering handle 32 to be described later. The rear wheels 7L and 7R are driven and rotated independently with each other by left and right traveling motors 8L, 8R, and form part of driving wheels of the dump truck 1. The left and right traveling motors 8L, 8R are configured of a large-sized electric motor, and are driven and rotated by power supply thereto through the motor control device 9 to be described later from an in-vehicle primary generator (not shown).

An explanation will be made of an electric system for traveling drive that is mounted on the dump truck 1 with reference to FIG. 2 and FIG. 3.

Figure 3:
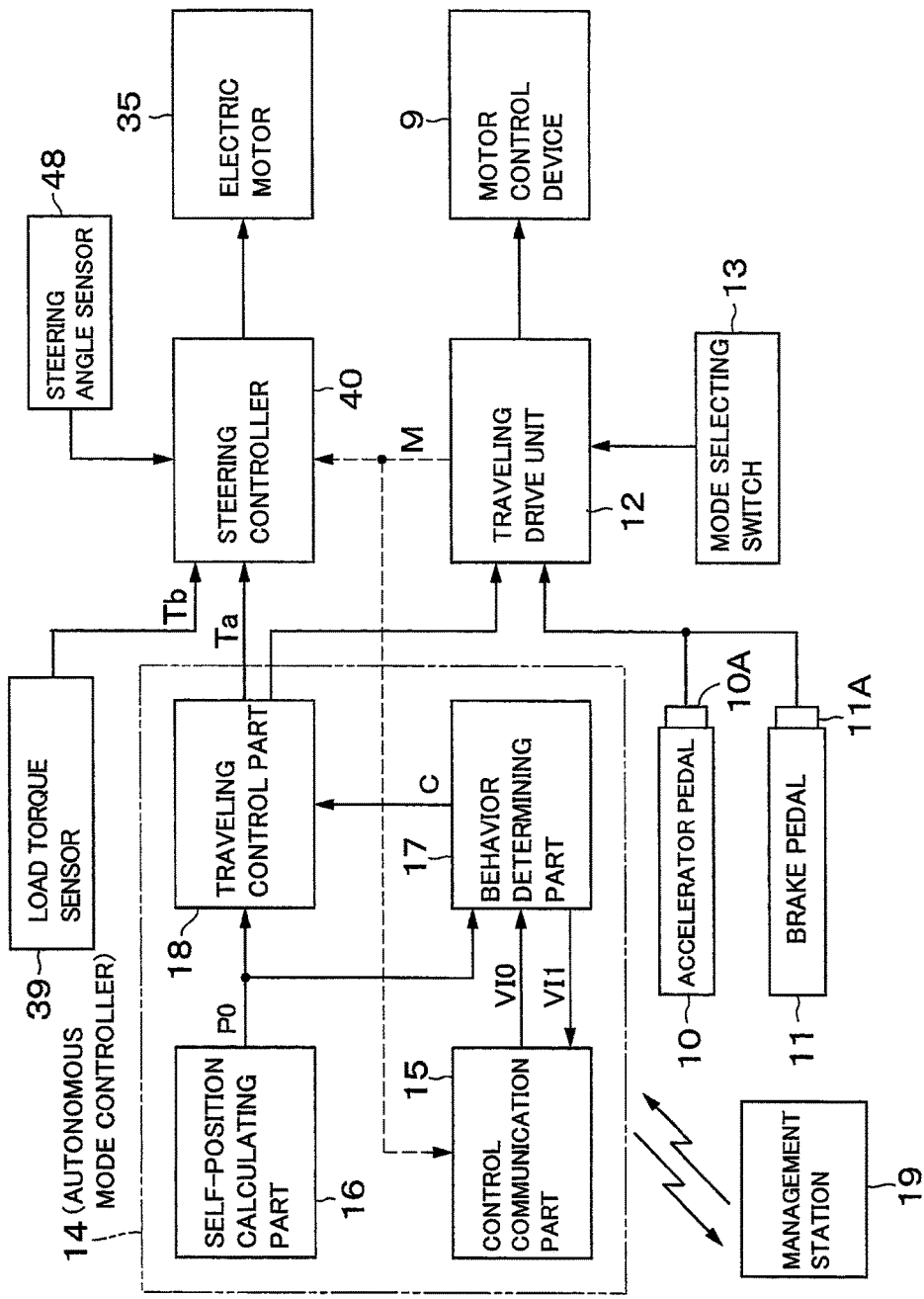
FIG. 3 is a control block diagram showing a relation of an autonomous mode controller, a traveling drive unit and a steering controller in FIG. 2.

As shown in FIG. 3, the accelerator pedal 10 is provided with an accelerator operation sensor 10A that detects an operating amount thereof. The accelerator operation sensor 10A is configured of, for example, an angle sensor, a potentiometer and the like, and outputs an acceleration command in accordance with the operating amount (depressing amount) of the accelerator pedal 10.

The brake pedal 11 forms part of a brake operating device that operates a brake of a vehicle. The brake pedal 11 is provided with a brake operation sensor 11A that detects an operating amount. The brake operation sensor 11A is configured of, for example, an angle sensor, a potentiometer and the like, and outputs a brake command in accordance with the operating amount (depressing amount) of the brake pedal 11.

Figure 2:
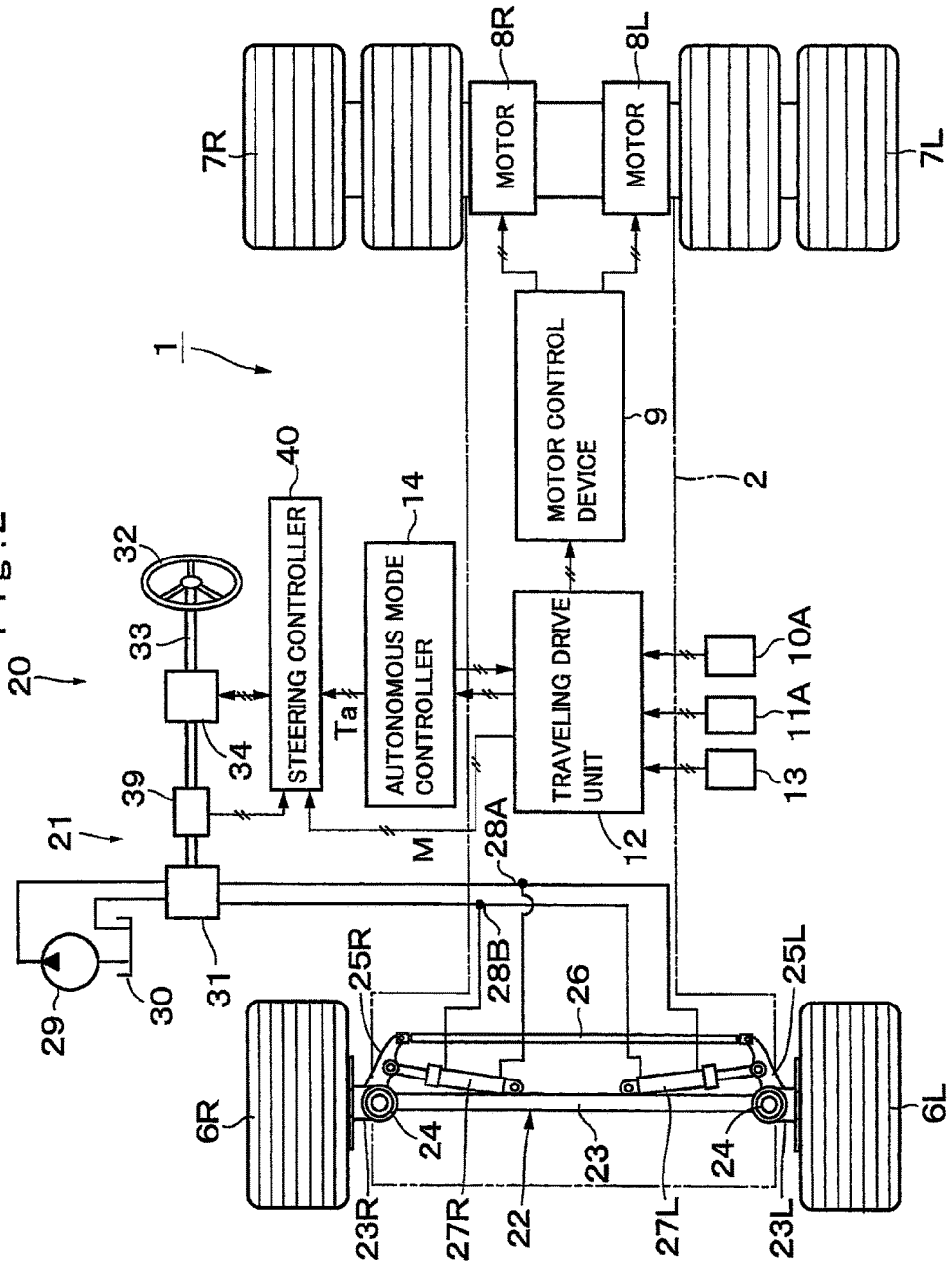
FIG. 2 is an entire configuration diagram showing a steering system and a traveling drive system of a dump truck according to a first embodiment.

As shown in FIG. 2, an output side of each of the accelerator operation sensor 10A and the brake operation sensor 11A is connected to a traveling drive unit 12. The traveling drive unit 12 is configured of, for example, a microcomputer and the like. The traveling drive unit 12 is a control device that controls a traveling drive of a vehicle (dump truck 1) based upon the acceleration command by the accelerator pedal 10 and the brake command by the brake pedal 11. The traveling drive unit 12 is connected at the output side to the motor control device 9 and the like, and outputs a control signal in accordance with a traveling state of the dump truck 1 or the like to the motor control device 9. The motor control device 9 switch-controls a switching element of an inverter (none of them are shown) according to the control signal.

The accelerator operation sensor 10A and the brake operation sensor 11A are connected to an input side of the traveling drive unit 12. The acceleration command by the accelerator operation sensor 10A and the brake command by the brake operation sensor 11A are input to the input side of the traveling drive unit 12. An autonomous mode controller 14 is connected to the traveling drive unit 12 through an external input terminal or the like. An acceleration command from the autonomous mode controller 14 and a brake command from the autonomous mode controller 14 are input to the traveling drive unit 12. Further, a mode selecting switch 13 is connected to the traveling drive unit 12 to select anyone of a manual mode and an autonomous mode.

When the manual mode is selected by the mode selecting switch 13, the traveling drive unit 12 calculates an acceleration command based upon a signal (command) from the accelerator operation sensor 10A, and calculates a brake command based upon a signal (command) from the brake operation sensor 11A. The traveling drive unit 12 controls the motor control device 9 based upon the acceleration command and the brake command.

On the other hand, when the autonomous mode is selected by the mode selecting switch 13, the traveling drive unit 12 calculates an acceleration command and a brake command based upon a signal (command) from the autonomous mode controller 14. The traveling drive unit 12 controls the motor control device 9 based upon the acceleration command and the brake command.

Next, an explanation will be made of the autonomous mode controller 14 for causing the dump truck 1 to autonomously travel with reference to FIG. 2 and FIG. 3.

As shown in FIG. 3, the autonomous mode controller 14 includes a control communication part 15, a self-position calculating part 16, a behavior determining part 17, and a traveling control part 18. The control communication part 15 mutually performs an interactive communication with an external management station 19 to be described later. The control communication part 15 receives various types of driving commands V10 including other vehicle information such as a traveling state and a vehicle position of another dump truck from the management station 19. The control communication part 15 outputs the driving command V10 to the behavior determining part 17.

Further, the control communication part 15 receives input of a mode signal M from the traveling drive unit 12, and receives input of own vehicle information V11 such as a traveling state and a vehicle position P0 of the dump truck 1 from the behavior determining part 17. The control communication part 15 determines a mode selected out of the manual mode and the autonomous mode by the mode signal M, and transmits the selected mode and the own vehicle information V11 toward the management station 19. As a result, the management station 19 can recognize in which mode of the manual mode and the autonomous mode the dump truck 1 is operating. In addition thereto, the management station 19 can recognize in which one of a traveling state and a stopping state the dump truck 1 is. Therefore, the management station 19 can output the driving command V10 in accordance with the above.

The self-position calculating part 16 forms part of a vehicle position calculating part that calculates an own vehicle position P0. The self-position calculating part 16 is connected to, for example, a GPS antenna (not shown), and calculates a vehicle position P0 based upon a signal transmitted from a GPS satellite.

The behavior determining part 17 determines a traveling movement of the dump truck 1 in the autonomous mode. Specifically, the behavior determining part 17 determines a movement of the dump truck 1 in the autonomous mode based upon the vehicle position P0 calculated by the self-position calculating part 16 and the driving command V10 received by the control communication part 15. The behavior determining part 17 outputs a movement command C including a target vehicle speed in accordance with the movement determined in this way to the traveling control part 18. In addition, the behavior determining part 17 outputs the own vehicle information V11 based upon the traveling state and the vehicle position P0 of the dump truck 1 in response to the movement command C to the control communication part 15.

The traveling control part 18 calculates an acceleration command, a brake command and a steering torque command (that is, a target torque Ta) based upon the vehicle position P0 calculated by the self-position calculating part 16 and a predetermined traveling track. The traveling control part 18 controls a steering controller 40 (electric motor device 34), the engine and the motor control device 9 of the dump truck 1 based upon the movement command C from the behavior determining part 17 and the vehicle position P0 calculated by the self-position calculating part 16 to perform the movement determined by the behavior determining part 17. As shown in FIG. 3, the traveling control part 18 calculates and outputs the target torque Ta for steering, the acceleration command and the brake command based upon the movement command C and the vehicle position P0.

The target torque Ta as a steering torque command value is found by multiplying a target steering angle (angle) by a predetermined gain. Specifically, the traveling control part 18 calculates a steering direction and a target steering angle of a vehicle such that the dump truck 1 travels in the autonomous mode according to the predetermined traveling track, based upon the movement command C and the vehicle position P0. The traveling control part 18 outputs the target torque Ta for steering in accordance with the calculated steering direction and the calculated target steering angle to the steering controller 40.

Thereby, the steering controller 40 controls rotation of an electric motor 35 according to an assistance torque based upon the then-target torque Ta for steering and a steering load torque Tc to be described later. The rotation of the electric motor 35 is transmitted to a steering valve 31 to be described later through a steering column 33 in a steering mechanism unit 21. As a result, the steering valve 31 is driven and the front wheels 6L, 6R are steered in the autonomous mode.

The external management station 19 shown in FIG. 3 forms part of an external control device that carries out a driving management for a working site to a plurality of the dump trucks 1 together with the autonomous mode controller 14. The management station 19 receives the own vehicle information V11 of the dump truck 1, the mode signal M and the like through the control communication part 15. As a result, the management station 19 recognizes in which mode of the manual mode and the autonomous mode the dump truck 1 moves. Further, the management station 19 recognizes in which state of the traveling state and the stopping state the dump truck 1 is, and outputs the driving command V10 in accordance therewith to the control communication part 15. The management station 19 performs an interactive communication with the control communication part 15 in the autonomous mode controller 14, and transmits various types of driving commands V10 to the dump truck 1 by wireless communications or the like.

Next, an explanation will be made of the configuration of a steering control device 20 as a steering system mounted on the dump truck 1 with reference to FIG. 2 to FIG. 6. Here, the steering control device 20 (steering system) includes the mechanical steering mechanism unit 21 and the steering controller 40 that performs an electrical steering control through the electric motor 35 to be described later. In the steering mechanism (that is, the steering mechanism unit 21) in the steering control device 20, a steering link mechanism 22 and the steering valve 31 to be described later, and the like form part of load portions.

The steering mechanism unit 21 in the steering control device 20 is configured of a power steering mechanism that changes a direction of steering wheels (that is, the front wheels 6L and 6R) in response to an operation of the steering handle 32 of an operator by using a driving force of the electric motor 35 and a hydraulic force, for example. Here, the steering mechanism unit 21 includes the steering link mechanism 22, a hydraulic circuit for hydraulically driving the steering cylinders 27L and 27R to be described later (that is, a hydraulic pump 29, a hydraulic oil tank 30 and the steering valve 31), the steering handle 32, the steering column 33, the electric motor device 34, a load torque sensor 39 and the like.

The steering link mechanism 22 includes a link member 23 coupled to the vehicle body 2 between the left and right front wheels 6L and 6R, a pair of left and right spindles 23L, 23R that are attached on both of left and right ends of the link member 23 and rotatably support the front wheels 6L and 6R, and the steering cylinders 27L and 27R to be described later. A king pin 24 extending in the upper-lower direction is provided to be integral with the left spindle 23L of the pair of left and right spindles 23L, 23R. The spindle 23L and the front wheel 6L are supported to be rotatable in a horizontal direction (that is, the front-rear direction) at the center of the king pin 24. A knuckle arm 25L extending backward is provided to be integral with the spindle 23L.

The right spindle 23R is formed to be bilaterally symmetric to the left spindle 23L. Therefore, the king pin 24 extending in the upper-lower direction is provided to be integral with the right spindle 23R as similar to the left spindle 23L. The spindle 23R and the front wheel 6R are supported to be rotatable in the horizontal direction (in the front-rear direction) at the center of the king pin 24. A knuckle arm 25R extending backward is provided to be integral with the spindle 23R. Tip portions of the knuckle arms 25L and 25R are jointed by a bar-shaped tie rod 26 extending in the left-right direction. The link member 23, the knuckle arms 25L and 25R, and the tie rod 26 form part of a substantially quadrangular link mechanism. With this link mechanism, the spindles 23L and 23R rotate and displace such that the front wheels 6L and 6R are steered to be inclined in the same direction to each other in the left-right direction.

The steering cylinders 27L and 27R are configured of hydraulic cylinders that extend/contract by delivery/discharge of pressurized oil from the hydraulic pump 29 to be described later. The left steering cylinder 27L has a base portion that is rotatably attached to a cylinder bracket (not shown) of the link member 23, and a tip portion that is rotatably jointed to the midway position of the knuckle arm 25L in the length direction. Similarly, the right steering cylinder 27R has a base portion that is rotatably attached to the cylinder bracket (not shown) of the link member 23, and a tip portion that is rotatably jointed to the midway position of the knuckle arm 25R in the length direction.

The steering cylinders 27L and 27R each have a rod-side oil chamber and a bottom-side oil chamber (any thereof is not shown). The rod-side oil chamber in the one steering cylinder 27L is connected to the bottom-side oil chamber of the other steering cylinder 27R through a hydraulic line 28A, and the bottom-side oil chamber in the one steering cylinder 27L is connected to the rod-side oil chamber of the other steering cylinder 27R through a hydraulic line 28B. Therefore, by delivery and discharge of pressurized oil from a hydraulic source (hydraulic pump 29 and hydraulic oil tank 30) through the steering valve 31 to the steering cylinders 27L and 27R, when one of the steering cylinders 27L and 27R extends, the other thereof contracts. Therefore, the left and right front wheels 6L and 6R are operated to be steered in any direction in response to extension/contraction of the steering cylinders 27L and 27R to perform a steering operation of the vehicle.

Figure 4:
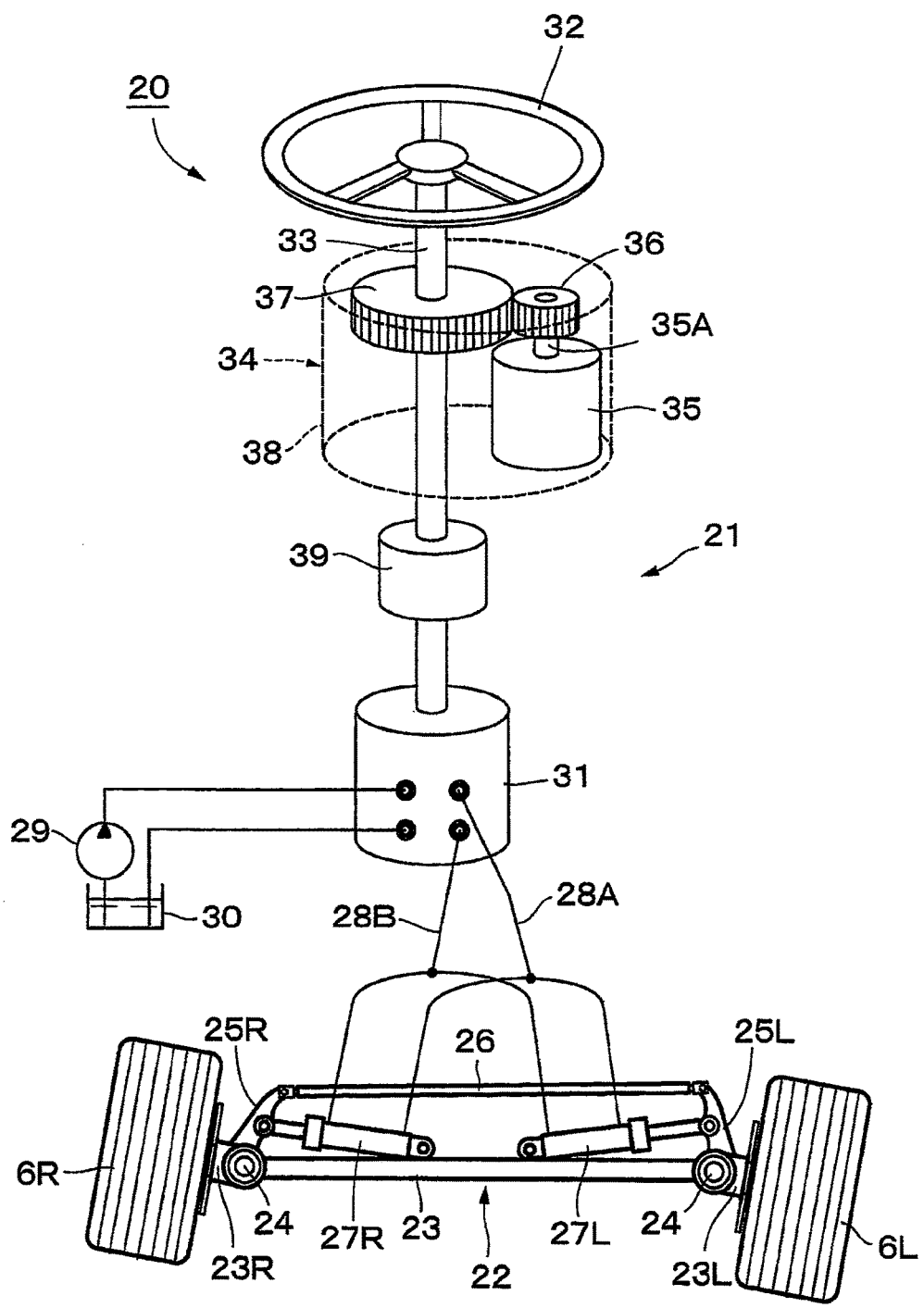
FIG. 4 is a configuration diagram showing a steering control device in the steering system in FIG. 2.

The hydraulic pump 29 is driven/rotated by the engine, and delivers hydraulic oil suctioned from the hydraulic oil tank 30 to the steering valve 31 as high-pressure pressurized oil. The hydraulic oil tank 30 is attached to a lateral surface of the vehicle body 2 as shown in FIG. 1. As shown in FIG. 2 and FIG. 4, the steering valve 31 is connected on one side to the hydraulic pump 29 and the hydraulic oil tank 30 as hydraulic sources. An output side of the steering valve 31 is connected to each of the oil chambers of the steering cylinders 27L and 27R through a pair of the hydraulic lines 28A, 28B.

The steering valve 31 performs switching control of supply and discharge of pressurized oil to and from the steering cylinders 27L and 27R in response to an operation of the steering handle 32. The steering valve 31 is configured using, for example, a rotary valve, a spool valve or the like. The steering valve 31 is coupled to the steering handle 32 through the steering column 33 and the like. The electric motor device 34 and the load torque sensor 39 are provided in the middle of the steering column 33. The electric motor device 34 is positioned between the steering handle 32 and the load torque sensor 39 to be arranged to be capable of applying a rotational force to the steering column 33.

The steering handle 32 as a steering wheel is provided in the cab 5, a steering operation of which is performed by an operator. The steering handle 32 is gripped by the operator to rotate the steering column 33 to left and right, thus performing a steering operation of the vehicle. The steering handle 32 forms part of a steering operation device that operates the traveling direction of a vehicle at a manual mode time. It should be noted that the steering operation device is not limited to the steering handle 32 operated/rotated by an operator, but may be configured of, for example, a lever operable to be tilted/lifted in the steering direction, or the like. In addition, when the dump truck 1 is driven in the autonomous mode, the electric motor device 34 forms part of the steering operation device.

When the dump truck 1 is driven in the manual mode, the steering valve 31 switches supply and discharge of pressurized oil in response to a rotation direction of the steering handle 32 and the electric motor device 34 (driven gear 37). In addition, the steering valve 31 controls a flow amount of pressurized oil flowing from the hydraulic pump 29 to the steering cylinders 27L, 27R in response to a rotation angle of the steering handle 32 (that is, the driven gear 37). On the other hand, when the dump truck 1 is driven in the autonomous mode, the steering valve 31 is operated by a rotational force from the electric motor device 34 (that is, the driven gear 37). The steering valve 31 switches supply and discharge of pressurized oil in response to the rotation direction of the electric motor device 34 (driven gear 37), and controls a flow amount of pressurized oil in response to the rotation angle of the driven gear 37.

The electric motor device 34, as shown in FIG. 4, includes an electric motor 35, a driving gear 36 provided on an output shaft 35A of the electric motor 35, and the driven gear 37 that is fixedly provided in the middle of the steering column 33 and is meshed with the driving gear 36. The driving gear 36 and the driven gear 37 form part of a reduction mechanism that reduces rotation of the electric motor 35 to be transmitted to the steering column 33. As shown in a dotted line in FIG. 4, the electric motor device 34 has a tubular case 38 that accommodates the electric motor 35, the driving gear 36 and the driven gear 37. The output shaft 35A of the electric motor 35 is arranged in the case 38 to extend in parallel to the steering column 33.

Therefore, the electric motor 35 and the driving gear 36 can be removed from the inside of the case 38, and it is possible to facilitate a model change and a recombination work to the steering control device (steering system) that does not use the autonomous mode and is dedicated to the manual mode. In addition, in a case of a model in which the manual mode and the autonomous mode are selectively used by an operation of the mode selecting switch 13, the electric motor device 34 may be configured as shown in FIG. 4.

Here, the driving gear 36 and the driven gear 37 are configured using a spur gear. Therefore, the output shaft 35A of the electric motor 35 is arranged to extend in parallel to the steering column 33. However, the driving gear and the driven gear may be configured using a bevel gear or the like.

In this case, the output shaft 35A of the electric motor 35 can be arranged to be inclined obliquely to the steering column 33. In addition, instead of the driving gear 36 and the driven gear 37, a reduction mechanism using, for example, a pulley, a belt, a chain and the like may be adopted. Further, the electric motor device may be configured by arranging a rotor of the electric motor to be coaxial with the steering column.

The load torque sensor 39 is arranged in the midway position of the steering column 33 between the steering valve 31 (load portion) and the electric motor device 34. The load torque sensor 39 detects a torsion torque generated in the steering column 33 therebetween as a steering load torque sensor output value Tb, and outputs the torsion torque to the steering controller 40. Here, the steering load torque is torque that is added to the steering column 33 by a friction torque generated onto a road surface for steering (steering rotation) the left and right front wheels 6L, 6R, a load torque applied to the steering system and the like such as a self-aligning torque subjected to the front wheels 6L, 6R by a steering operation during the traveling, and the like. The steering load torque is transmitted to an operator as a load at the steering through a path in reverse to a transmission path to the front wheels 6L, 6R (road surface). Therefore, in a situation where the load torque applied to the steering system is large, a large steering torque is required, which is a large burden for an operator as well.

In the steering control device 20 adopted in the first embodiment, a part or all of the steering torque given to the steering handle 32 by an operator is supplemented or the steering handle 32 is driven by the assistance torque of the electric motor 35 even at the manual mode time, for example. Thereby, a force necessary for the handle operation of an operator can be power-supplemented, reducing a burden and fatigue of the operator. In addition, the steering control device 20 is configured such that at the autonomous mode time, the handle operation of the operator is made unnecessary, allowing automatic steering by the electric motor device 34.

The steering mechanism unit 21 in the steering control device 20 is provided with a hydraulic steering system in addition to a mechanical steering system by the electric motor 35. This steering mechanism unit 21 rotates the steering column 33 by a driving force of the electric motor device 34 by the steering handle 32 to mechanically steer the steering wheel, and further, steers the steering wheel through hydraulic pressures of the steering valve 31 and the like. The steering mechanism unit 21 has an advantage that it is possible to generate a large steering force by the hydraulic pressure and the mount position is released from restrictions due to unnecessity of a mechanical link joint. Therefore, the steering mechanism unit 21 in the steering control device 20 has the structure that is not limited to dump trucks for mine (rigid dump trucks and articulate dump trucks), but can be widely used to large-sized working vehicles such as wheel loaders, fork lifts, agricultural machines and the like.

Next, descriptions will be made of the steering controller 40 that performs electrical control of the steering control device 20.

As shown in FIG. 2, the steering controller 40 is arranged between the autonomous mode controller 14 and the electric motor device 34. The steering controller 40 is configured of, for example, a microcomputer and the like as a steering control section that controls rotation of the electric motor 35. The steering controller 40 has an input side that is connected to the traveling drive unit 12, the autonomous mode controller 14, the load torque sensor 39 and a steering angle sensor 48 to be described later and the like, and an output side that is connected to the electric motor 35.

The autonomous mode controller 14 is connected to the steering controller 40 through an external input terminal and the like, and receives input of a target torque Ta (steering torque command value) from the autonomous mode controller 14 to perform the autonomous steering. In addition thereto, the traveling drive unit 12 is connected to the steering controller 40, and a mode signal M corresponding to a mode selected out of the manual mode and the autonomous mode is input to the steering controller 40 from the traveling drive unit 12. When the mode signal M for selecting the manual mode is input, the steering controller 40 processes the target torque Ta for steering from the autonomous mode controller 14 to be invalid (that is, the target torque Ta is zero).

On the other hand, when the mode signal M for selecting the autonomous mode is input, the steering controller 40 processes the target torque Ta to be outputted from the autonomous mode controller 14 to the steering controller 40 to be valid, and calculates an assistance torque based thereupon as described later. The target torque Ta as a steering torque command value is found by multiplying the aforementioned target steering angle (angle) by a predetermined gain. In addition, the steering controller 40 calculates the assistance torque by an assistance torque calculating part 42 to be describe later based upon the steering target torque Ta from the autonomous mode controller 14 and the load torque sensor output value Tb by the load torque sensor 39, and outputs a drive current required for generating the assistance torque from an inverter 43 to the electric motor 35.

Figure 5:
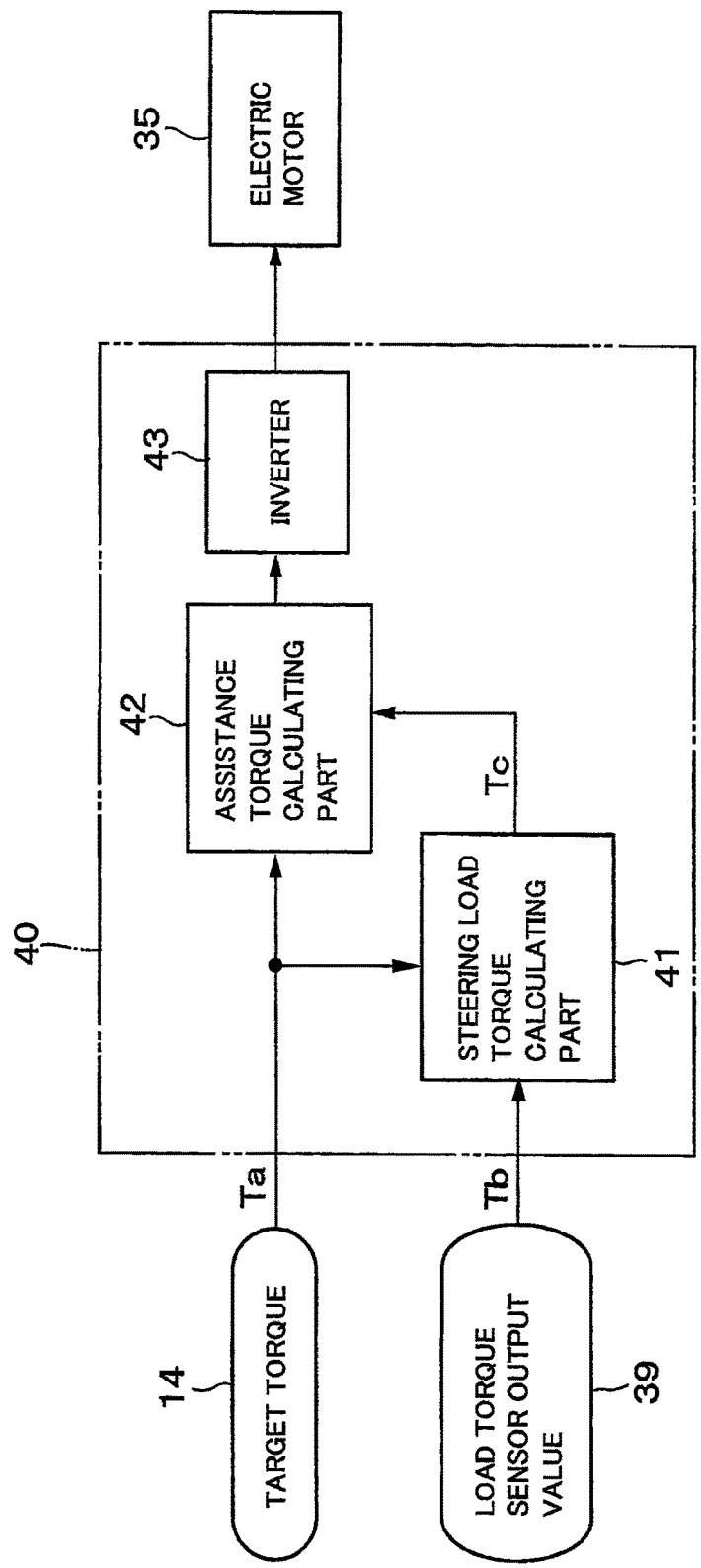
FIG. 5 is a control block diagram showing the steering controller in FIG. 2.

Here, the steering controller 40 is, as shown in FIG. 5, configured of the steering load torque calculating part 41 as a steering load torque calculating section, the assistance torque calculating part 42 as an assistance torque calculating section, and the inverter 43. The inverter 43 supplies (outputs) a drive current to the electric motor 35 to generate the assistance torque calculated in the assistance torque calculating part 42 in the electric motor device 34.

The steering load torque calculating part 41 calculates the steering load torque Tc based upon the output value (load torque sensor output value Tb) of the load torque sensor 39. As shown in FIG. 5, the assistance torque calculating part 42 adds the steering load torque Tc outputted from the steering load torque calculating part 41 and the target torque Ta (steering torque command value) input from an exterior (for example, the autonomous mode controller 14) to calculate the assistance torque commanding the electric motor 35 in the electric motor device 34, and outputs this as a command signal to the inverter 43.

Figure 6:
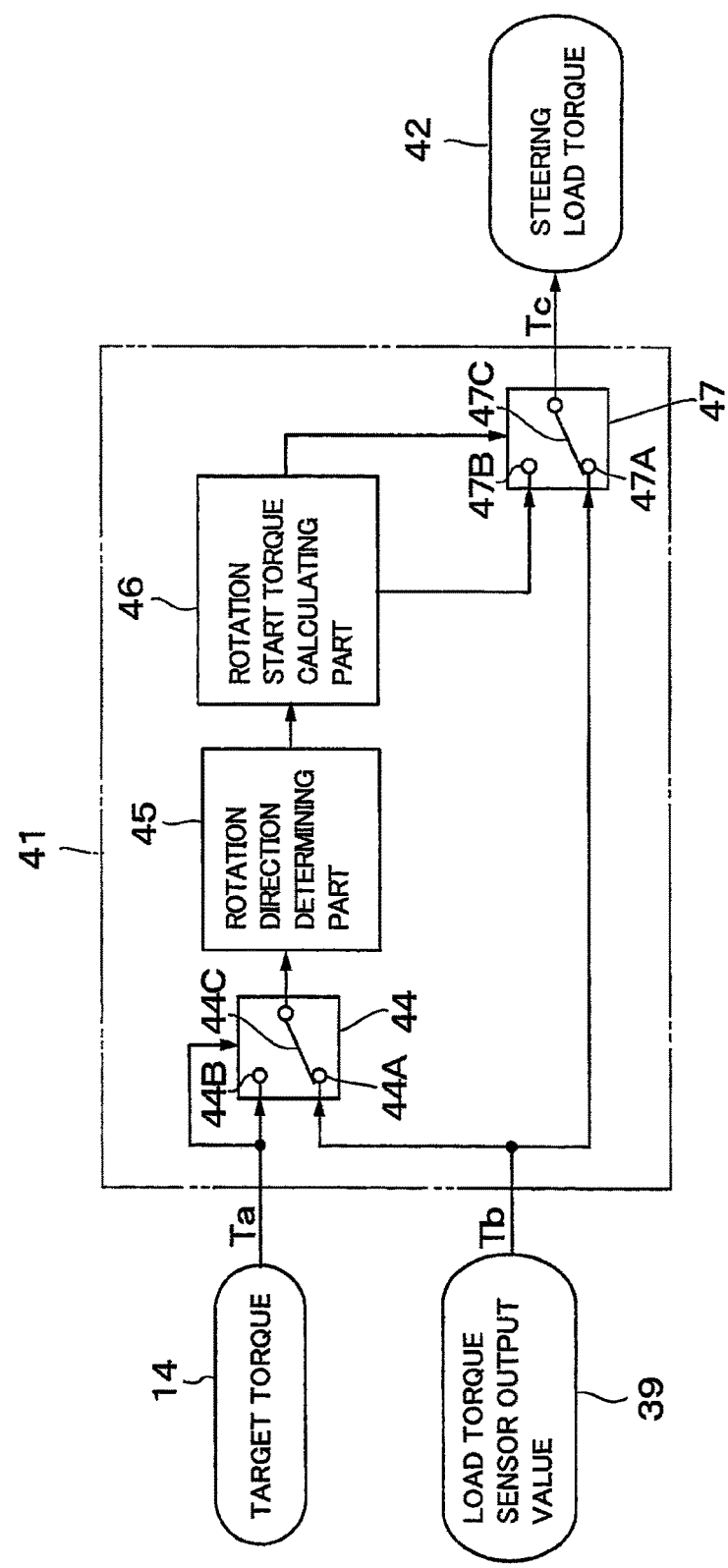
FIG. 6 is a control block diagram showing a steering load torque calculating part in FIG. 5.

In the present embodiment, the steering load torque calculating part 41 includes, for example, as shown in FIG. 6, a mode switching part 44, a rotation direction determining part 45 as a rotation direction determining section, a rotation start torque calculating part 46 as a rotation start torque calculating section, and a torque switching part 47 as a torque switching section.

Here, the rotation start torque is a load torque by a static friction of the mechanism in the steering system or the steering valve 31. Since a static frictional force is larger than a dynamic frictional force, at the instant when the steering column 33 starts to rotate, a larger torque is required than during the rotation. In this way, at the instant when the steering column 33 starts to rotate, the torque to be generated in the rotation start torque calculating part 46 is the rotation start torque. As the rotation start torque, it is possible to determine a necessary torque value with reference to a table mapped using values preliminarily determined by measurement, state amounts of a vehicle or the like.

The mode switching part 44 in the steering load torque calculating part 41 has, for example, a manual mode contact point 44A, an autonomous mode contact point 44B and a movable contact point 44C, and at the manual mode time, the movable contact point 44C is connected to the manual mode contact point 44A. On the other hand, at the autonomous mode time, the movable contact point 44C is disconnected from the manual mode contact point 44A, and is connected to the autonomous mode contact point 44B. When the dump truck 1 is driven in the manual mode, the target torque Ta for steering is not input from the autonomous mode controller 14 to the steering controller 40 (steering load torque calculating part 41), and the target torque Ta in this case is processed as zero.

Therefore, the steering load torque calculating part 41 at the manual mode time detects in which direction of the left and right steering (rotation) directions the output value (load torque sensor output value Tb) of the load torque sensor 39 has risen from a zero state, by the rotation direction determining part 45. The rotation start torque calculating part 46 connected to the subsequent stage (output side) of the rotation direction determining part 45 outputs a rotation start torque having a preset magnitude in a direction of assisting in the steering column 33 in the rotation direction based upon a start of rotation detected by the rotation direction determining part 45 and the rotation direction.

The torque switching part 47 connected to the subsequent stage of the rotation start torque calculating part 46 has, for example, a sensor-side contact point 47A, a rotation start-side contact point 47B and a movable contact point 47C. At a regular time, the movable contact point 47C is connected to the sensor-side contact point 47A. On the other hand, when the rotation start torque is outputted from the rotation start torque calculating part 46, the movable contact point 47C is switched from the sensor-side contact point 47A to the rotation start-side contact point 47B, and is connected to the rotation start-side contact point 47B over a predetermine short time. Therefore, the torque switching part 47 outputs the rotation start torque as the steering load torque Tc instead of the output value from the load torque sensor 39 over a short time (refer to switching signals 55, 56 in FIG. 10) when the rotation start torque is outputted from the rotation start torque calculating part 46.

In this way, the steering load torque calculating part 41 outputs the rotation start torque of a preset magnitude as the steering load torque Tc in a direction of assistance in the rotation direction at the time of detecting a start of the rotation by the output value of the load torque sensor 39 at the manual mode time. The steering load torque calculating part 41 outputs the output value of the load torque sensor 39 (load torque sensor output value Tb) as the steering load torque Tc when a predetermined short time elapses thereafter.

On the other hand, when the dump truck 1 is driven in the autonomous mode, the movable contact point 44C in the mode switching part 44 is switched and connected to the autonomous mode contact point 44B. Therefore, the steering load torque calculating part 41 detects in which direction of the left and right steering (rotation) directions the target torque Ta for steering input from an exterior (for example, the autonomous mode controller 14) has risen from a zero state, by the rotation direction determining part 45. Next, the rotation start torque calculating part 46 outputs a rotation start torque having a preset magnitude in a direction of assisting in the steering column 33 in the rotation direction based upon a start of rotation detected by the rotation direction determining part 45 and the rotation direction. The rotation start torque is set to a torque value having the same magnitude at the autonomous mode time and at the manual mode time as well.

Next, in the torque switching part 47, when the rotation start torque is outputted from the rotation start torque calculating part 46, the movable contact point 47C is switched from the sensor-side contact point 47A to the rotation start-side contact point 47B as similar to the manual mode time. Thereby, the movable contact point 47C is connected to the rotation start-side contact point 47B over a predetermine short time. Therefore, the torque switching part 47 outputs the rotation start torque as the steering load torque Tc instead of the output value from the load torque sensor 39 over a short time (refer to switching signals 55, 56 in FIG. 10) when the rotation start torque is outputted from the rotation start torque calculating part 46.

In this way, the steering load torque calculating part 41 outputs the rotation start torque of a preset magnitude as the steering load torque Tc in a direction of assistance in the rotation direction at the time of detecting a start of the rotation by the target torque Ta for steering input from the autonomous mode controller 14 at the autonomous mode time. When a predetermined short time elapses thereafter, the movable contact point 47C in the torque switching part 47 is switched to the sensor-side contact point 47A from the rotation start-side contact point 47B. As a result, the steering load torque calculating part 41 outputs the output value of the load torque sensor 39 (load torque sensor output value Tb) as the steering load torque Tc.

The steering angle sensor 48 as shown in FIG. 3 is an angle detector that detects an actual steering angle of any one wheel of the left and right front wheels 6L, 6R, for example. The steering angle sensor 48 is configured of, for example, an electromagnetic pickup rotation angle detector composed of a hall element and a magnet, an optical rotation angle detector composed of a light emitter and a light receiver, or the like. For example, when the front wheels 6L, 6R are directed in a straight-ahead direction of a vehicle, that is, when the front wheels 6L, 6R are in a straight-ahead state in parallel in the front-rear direction, the steering angle is detected as zero. When the front wheels 6L, 6R are inclined in a left-turn direction of a vehicle, the steering angle is detected as a plus (or minus) detection value, for example. When the front wheels 6L, 6R are inclined in a right-turn direction of a vehicle, the steering angle is detected as a minus (or plus) detection value, for example.

In this way, the steering angle sensor 48 outputs a steering angle detection signal in accordance with the steering angle of the front wheels 6L, 6R to the steering controller 40. At the autonomous mode driving time, the steering angle (that is, a rotation angle of the electric motor 35) of the steering column 33 is feedback-controlled based upon the steering angle detection signal by the steering controller 40. It should be noted that the steering angle sensor 48 is not necessarily a detector that detects the steering angle of the steering wheel (front wheels 6L, 6R). For example, by using a rotation sensor of a resolver detecting the rotation of the electric motor 35 or the like, the rotation of the electric motor 35 is feedback-controlled by the steering controller 40.

The dump truck 1 according to the first embodiment has the configuration as described above, and next, an operation thereof will be explained.

The dump truck 1 is driven in any of the manual mode in traveling by the manual operation of an operator and the autonomous mode in traveling by the driving command V10 from the management station 19.

Therefore, an explanation will be first made of a traveling movement of the dump truck 1 in the manual mode.

As shown in FIG. 3 to FIG. 5, when an operator operates and rotates the steering handle 32 in the manual mode, the steering controller 40 calculates an assistance torque in the assistance torque calculating part 42 based upon the load torque sensor output value Tb by the load torque sensor 39 in response to the steering of the operator, and outputs a drive current necessary for generating this assistance torque from the inverter 43 to the electric motor 35.

Thereby, in a state where the steering torque of the handle operation by the operator is reduced to be light, the steering column 33 in the steering mechanism unit 21 is rotated by the rotational force (that is, assistance torque) from the electric motor device 34. The steering valve 31 drives the steering cylinders 27L, 27R by the hydraulic force in accordance with this rotation to adjust the steering angle of the front wheels 6L, 6R.

Next, an explanation will be made of the traveling movement of the dump truck 1 in the autonomous mode.

When the mode selecting switch 13 of the dump truck 1 is operated to be switched, the dump truck 1 is switched from the manual mode to the autonomous mode. As shown in FIG. 3, the autonomous mode controller 14 outputs the target torque Ta for steering to the steering controller 40 at the autonomous mode time, and outputs an acceleration command for accelerating a vehicle and/or a brake command for decelerating a vehicle to the traveling drive unit 12.

As shown in FIG. 5, the steering controller 40 calculates an assistance torque by the assistance torque calculating part 42 based upon the target torque Ta for steering from the autonomous mode controller 14 and the load torque sensor output value Tb (hereinafter, referred to as "load torque sensor value Tb) by the load torque sensor 39, and outputs a drive current necessary for generating this assistance torque from the inverter 43 to the electric motor 35. Thereby, the steering column 33 in the steering mechanism unit 21 is rotated by the rotational force (that is, assistance torque as a sum of the target torque Ta and the load torque sensor value Tb) from the electric motor device 34. The steering valve 31 drives the steering cylinders 27L, 27R by the hydraulic force in accordance with this rotation to adjust the steering angle of the front wheels 6L, 6R. Thereby, the dump truck 1 autonomously travels based upon the target torque Ta for steering from the autonomous mode controller 14.

Incidentally, the large-sized working vehicle represented by the dump truck 1 is, when the steering operation of the vehicle as a heavy load is started, subjected to an influence of a static frictional force larger than a so-called dynamic frictional force or the like. Therefore, at the start time of the steering operation, it is required to generate a large steering force (rotational torque) in the vehicle. That is, by a frictional resistance generated in the steering system at the time of starting to steer/rotate the left and right front wheels 6L, 6R, a frictional resistance when the steering valve 31 starts to rotate, or the like, it is required to generate a large steering force (rotational torque) at the steering start time.

Therefore, in the first embodiment, the steering load torque calculating part 41 in the steering controller 40 includes, for example, as shown in FIG. 6, the mode switching part 44, the rotation direction determining part 45, the rotation start torque calculating part 46 and the torque switching part 47. The steering load torque calculating part 41 calculates the steering load torque Tc according to the processing order as follows as shown in FIG. 7.

First, descriptions will be made of the steering processing by the manual mode.

Figure 7:
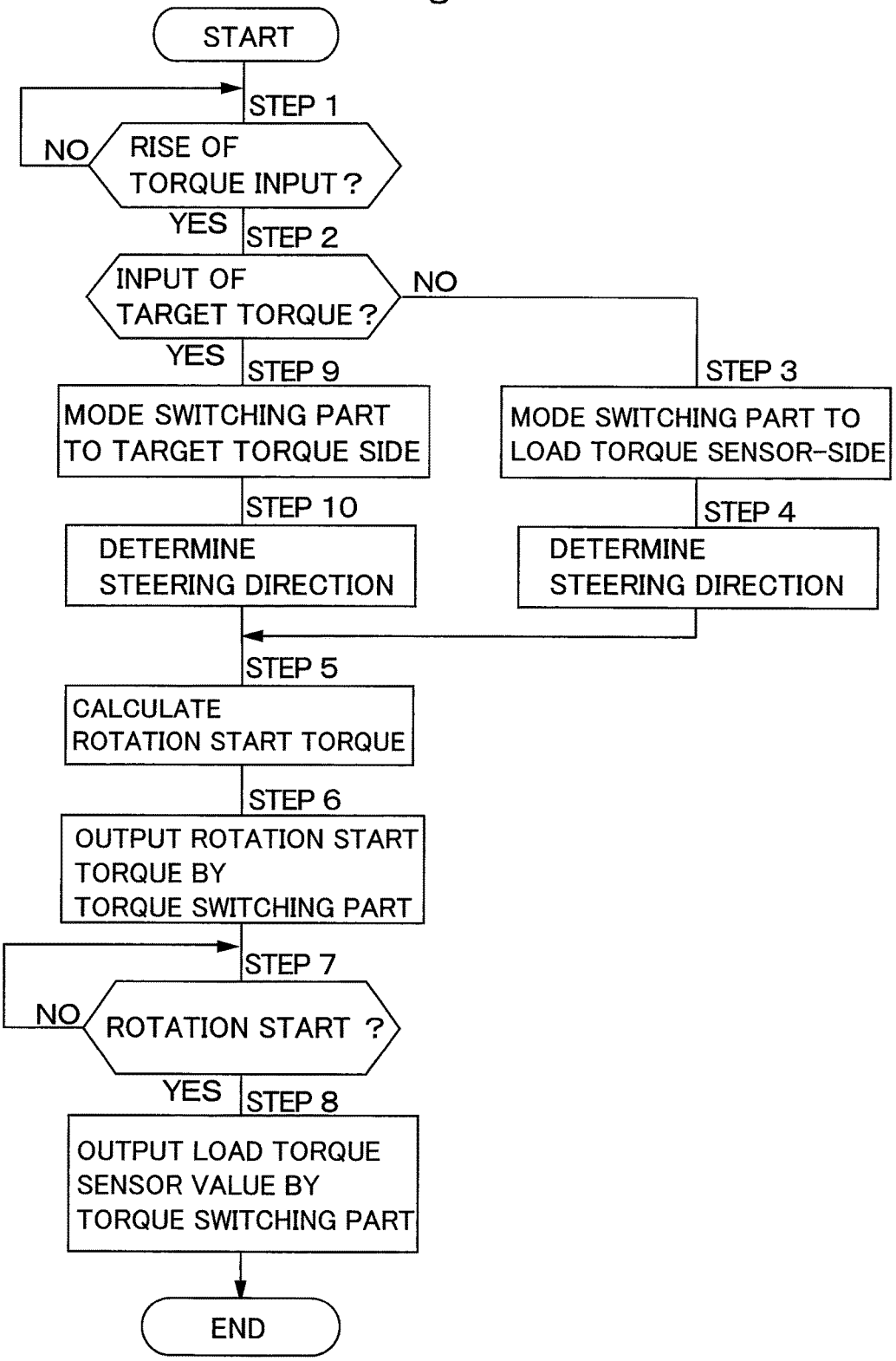
FIG. 7 is a flow chart showing a processing order by the steering load torque calculating part.

That is, when the processing movement as shown in FIG. 7 starts, at step 1 it is determined whether or not there is a rise of torque input. When at step 1 it is determined that "YES" determination is made, at next step 2 it is determined whether or not a target torque is input. When at step 2 it is determined that "NO" determination is made, that is a case where the target torque Ta for steering is not input to the steering controller 40 (steering load torque calculating part 41) from the autonomous mode controller 14, and the target torque Ta is processed as zero.

In this way, a case where at step 2 "NO" determination is made corresponds to a case where the dump truck 1 is driven in the manual mode and the output value (load torque sensor value Tb) of the load torque sensor 39 has risen from a state of zero to any of the left and right steering (rotation) directions. Therefore, at next step 3 the movable contact point 44C in the mode switching part 44 is kept to be connected to the manual mode contact point 44A (load torque sensor 39-side), and at next step 4 the steering direction will be determined.

That is, at step 4 to which direction of the left and right steering (rotation) directions the output value (load torque sensor value Tb) of the load torque sensor 39 has risen from a state of zero is detected by the rotation direction determining part 45 at the manual mode time. At next step 5, the rotation start torque calculating part 46 calculates a rotation start torque having a preset magnitude based upon a start of rotation detected by the rotation direction determining part 45 and the rotation direction.

At next step 6, the movable contact point 47C in the torque switching part 47 is switched to the rotation start-side contact point 47B from the sensor-side contact point 47A to output the rotation start torque from the rotation start torque calculating part 46. At next step 7, it is determined whether or not the steering column 33 starts to rotate by the rotation start torque from the rotation start torque calculating part 46. This determination processing may be executed by whether or not a predetermined short time (refer to switching signals 55, 56 in FIG. 10) has elapsed after switching the movable contact point 47C from the sensor-side contact point 47A to the rotation start-side contact point 47B.

While at step 7 "NO" determination is made, the determination processing at step 7 is repeated, and when at step 7 "YES" determination is made, at next step 8 the movable contact point 47C in the torque switching part 47 is switched from the rotation start-side contact point 47B to the sensor-side contact point 47A. Thereby, at step 8 the output value (load torque sensor value Tb) of the load torque sensor 39 is outputted as the steering load torque Tc.

In this way, when the steering load torque calculating part 41 detects the start of the rotation by the output value of the load torque sensor 39 at the manual mode time, the rotation start torque of the preset magnitude is outputted as the steering load torque Tc in a direction of assisting in the rotation direction, and when the predetermined short time elapses, the load torque sensor value Tb of the load torque sensor 39 is outputted as the steering load torque Tc. The steering controller 40 thus outputs the steering load torque Tc outputted from the steering load torque calculating part 41 as the assistance torque by the assistance torque calculating part 42, and outputs the driving current necessary for generating the assistance torque to the electric motor 35 from the inverter 43.

Next, descriptions will be made of the steering processing by the autonomous mode.

On the other hand, at the autonomous mode time the target torque Ta for steering is input to the steering controller 40 (steering load torque calculating part 41) from the autonomous mode controller 14, at aforementioned step 2, "YES" determination is made. Therefore, at next step 9 the movable contact point 44C in the mode switching part 44 is switched to the autonomous mode contact point 44B (target torque side) from the manual mode contact point 44A, and a signal of the target torque Ta is input to the rotation direction determining part 45.

At next step 10, the steering direction in this case is determined by the rotation direction determining part 45. That is, at step 10 to which direction of the left and right steering (rotation) directions the target torque Ta from the autonomous mode controller 14 has risen from a state of zero is detected by the rotation direction determining part 45. In addition, the processing at step 5 to step 8 in this case as well is executed in the same way as the manual mode time. Thereby, when the steering load torque calculating part 41 detects the rotation start of the steering column 33 by the target torque Ta at the autonomous mode time, the rotation start torque of the preset magnitude is outputted as the steering load torque Tc in a direction of assisting in the rotation direction.

Thereafter, when the predetermined short time (refer to the switching signals 55, 56 in FIG. 10) elapses, the steering load torque calculating part 41 outputs the output value (load torque sensor value Tb) of the load torque sensor 39 as the steering load torque Tc by switching the above rotation start torque. The steering controller 40 adds the steering load torque Tc outputted from the steering load torque calculating part 41 in this way to the target torque Ta from the autonomous mode controller 14 by the assistance torque calculating part 42 to calculate the assistance torque, and outputs the drive current necessary for generating the assistance torque to the electric motor 35 from the inverter 43.

Next, an explanation will be made of the movement in a case of steering the dump truck in the autonomous mode.

Figure 8:
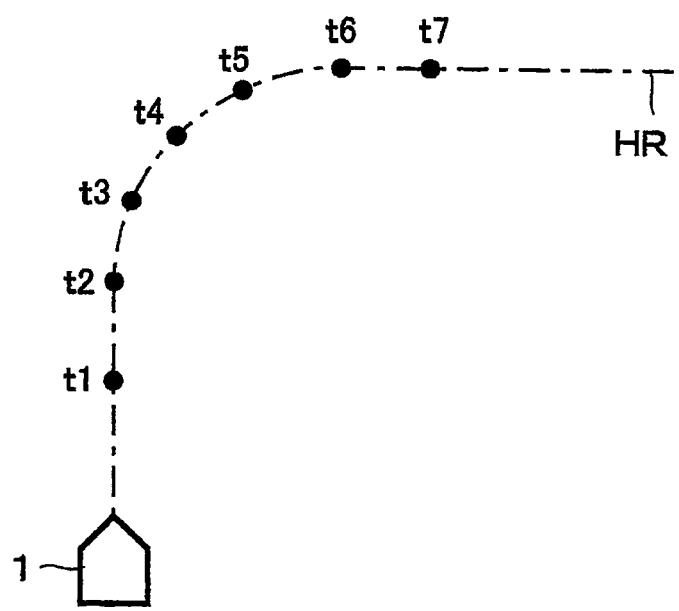
FIG. 8 is a schematic diagram showing a state where the dump truck is steered in a right turn and travels for a working site.

FIG. 8 shows, for example, a state where the dump truck 1 is steered in a right hand turn and travels for a working site in the autonomous mode. The dump truck 1 travels straight ahead to a position of time t1 to t2 in a transport path HR in the working site, but in a position of time t2 to t4, is steered to take a right turn. In a position of time t4 to t6, the steering column 33 is rotated in a direction of turning back the steering handle 32, and in a position of time t6 to t7 and thereafter, the dump truck 1 is operated to travel straight ahead again.

Figure 9:
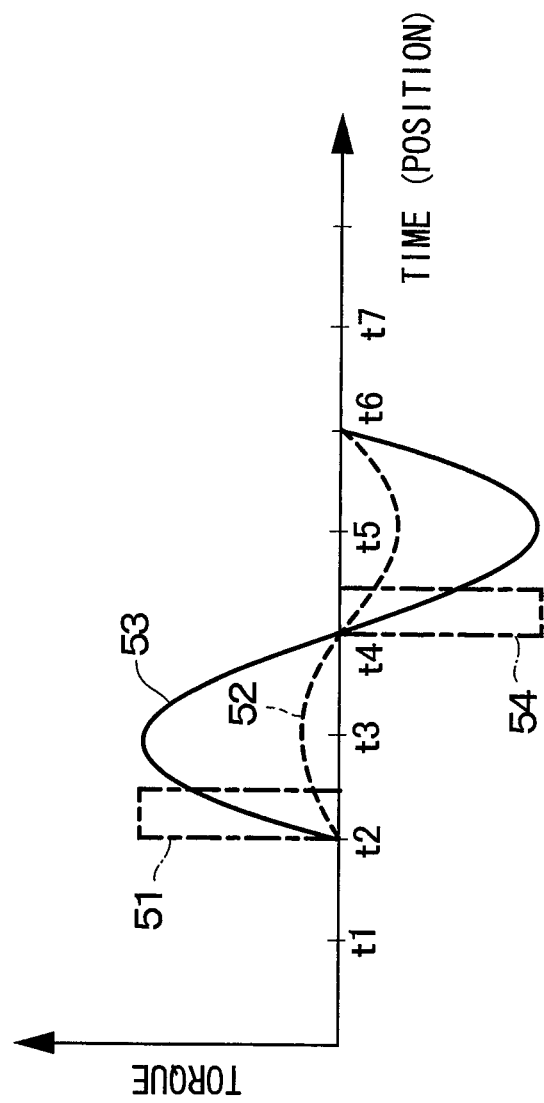
FIG. 9 is a characteristic line showing a relation of a target steering torque, a load torque and a rotation start torque to a steering position (time) in FIG. 8.

FIG. 9 shows a relation of a target steering torque, a load torque and a rotation start torque to a traveling position (time t1 to t7 in FIG. 8) of the dump truck 1. The characteristic line 51 shown in a dashed line indicates a characteristic of the rotation start torque when the steering starts to take a right turn in a position of time t2. The characteristic line 52 shown in a dotted line indicates a characteristic of the load torque sensor value Tb to be detected by the load torque sensor 39 in a position of time t2 to t6. The characteristic line 52 is a characteristic in which the detection direction of the torque is reversed (for example, a sine curve is drawn) in a position of time t4.

The characteristic line 53 shown in a solid line in FIG. 9 indicates a characteristic of the target torque Ta for steering, and changes to draw a sine curve corresponding to the rotation direction of the steering column 33 in a position of time t2 to t6. In addition, since the characteristic line 54 shown in a dashed line, for example, since the rotation direction of the steering column 33 is reversed in a position of time t4, indicates a characteristic of the rotation start torque following the reversed rotation at this time.

Figure 10:
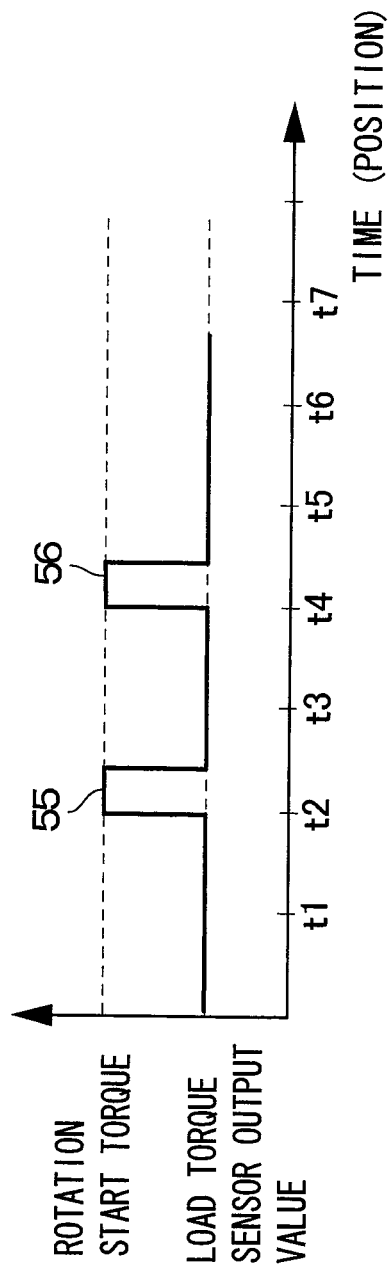
FIG. 10 is a characteristic line showing a movement characteristic of a torque switching part to a steering position (time) in FIG. 8.

FIG. 10 shows a movement characteristic of the torque switching part 47 to the traveling position (time t1 to t7 in FIG. 8) of the dump truck 1. That is, since the movable contact point 47C in the torque switching part 47 is connected to the sensor-side contact point 47A in a position of time t1 to t2 where the dump truck 1 travels straight ahead, the output value of the load torque sensor 39 (load torque sensor value Tb) is outputted as the steering load torque Tc from the steering load torque calculating part 41 to the assistance torque calculating part 42.

Next, when the steering is started by the target torque Ta in a position of time t2, the switching signal 55 shown in FIG. 10 is outputted for a short time only to switch the movable contact point 47C in the torque switching part 47 to the rotation start-side contact point 47B from the sensor-side contact point 47A. Thereby, the rotation start torque of the preset magnitude is outputted as the steering load torque Tc in a direction of assisting in the rotation direction from the steering load torque calculating part 41 to the assistance torque calculating part 42, as the characteristic line 51 as shown in a dashed line in FIG. 9.

Until time t4 after the output of the switching signal 55 is stopped after that, the movable contact point 47C in the torque switching part 47 is again connected to the sensor-side contact point 47A. Therefore, the output value of the load torque sensor 39 (load torque sensor value Tb) is outputted as the steering load torque Tc from the steering load torque calculating part 41 to the assistance torque calculating part 42. In addition, when the steering direction by the target torque Ta is reversed in a position of time t4, the switching signal 56 as shown in FIG. 10 is outputted for a short time only, and the movable contact point 47C in the torque switching part 47 is again switched to the rotation start-side contact point 47B from the sensor-side contact point 47A.

Thereby, the rotation start torque of the preset magnitude is outputted as the steering load torque Tc in a direction of assisting in the reversed rotation direction from the steering load torque calculating part 41 to the assistance torque calculating part 42, as the characteristic line 54 as shown in a dashed line in FIG. 9. Until time t7 after the output of the switching signal 56 is stopped after that, the movable contact point 47C in the torque switching part 47 is again connected to the sensor-side contact point 47A. Therefore, the output value of the load torque sensor 39 (load torque sensor value Tb) is outputted as the steering load torque Tc from the steering load torque calculating part 41 to the assistance torque calculating part 42.

In this way, according to the first embodiment, for example, at the time of causing the dump truck 1 to travel and perform a steering operation in the autonomous mode, the rotation start torque of the preset magnitude can be outputted in a direction of assisting in the steering column 33 in the steering direction (rotation direction) by the rotation start torque calculating part 46, based upon the start of the rotation detected by the rotation direction determining part 45 in the steering load torque calculating part 41 and the rotation direction. Accordingly, it is possible to suppress a large load from being given to the electric motor device 34 due to an influence of the so-called static frictional force at the steering start time.

Therefore, the electric motor 35 to be used in the electric motor device 34 can be configured of a small-sized motor to achieve a miniaturization and light-weight of the entire steering control device 20. In addition, the steering mechanism unit 21 in the steering control device 20 includes the steering link mechanism 22, and the hydraulic circuit (that is, the hydraulic pump 29, the hydraulic oil tank 30 and the steering valve 31) that drives the steering cylinders 27L, 27R in the steering link mechanism 22. Therefore, the direction of the front wheels 6L, 6R as the steering wheels can be changed using the force of the electric motor 35 and the hydraulic force, which also makes it possible to achieve the miniaturization and the light-weight of the electric motor 35.

In addition, even at the time of driving the dump truck 1 in the manual mode, the steering torque of the handle operation by an operator can be lightened. That is, an appropriate supplemental steering force can be generated to the steering operation by the operator to always perform the steering operation in a constant steering force. Therefore, even in a case where the steering operation by the operator is performed frequently and for a long time, the fatigue and the burden of the operator can be lightened by reducing the steering torque necessary for the handle operation by the operator to be small.

Particularly, the steering control device 20 according to the first embodiment is provided with the steering load torque calculating part 41 in the steering controller 40 including the mode switching part 44, the rotation direction determining part 45, the rotation start torque calculating part 46 and the torque switching part 47. Thereby, the rotation start torque necessary at the steering start time in the steering mechanism unit 21 side can be generated as the rotation start torque of the predetermined magnitude for compensation to make up for lack of the torque at the rotation start. Further, the weight at the instant the operator starts with the handle operation is lightened, achieving the effect of being capable of creating good steering feelings.

In addition, it is possible to make up for lack of the torque at the rotation start by compensating for the rotation start torque necessary at the steering start time of the steering system. Therefore, it is possible to drive the electric motor 35 following up the target torque Ta for steering without delay. Thereby, a time from a point of a rise of the target torque Ta for steering to a point where the steering system actually starts with the steering can be shortened to enhance responsiveness at the steering time.

Accordingly, according to the first embodiment, in the working vehicle represented by the dump truck 1, the steering load torque Tc generated in the steering column 33 between the load portion of the steering mechanism unit 21 and the electric motor device 34 by the steering operation in the manual mode by the operator or by the steering operation by the target torque at the autonomous mode time is detected in the load torque sensor 39 or is calculated in the steering load torque calculating part 41. The assistance torque is calculated in the assistance torque calculating part 42 based upon the calculated torque value, and the drive current necessary for generating the assistance torque is outputted from the inverter 43 to the electric motor 35 to drive the electric motor device 34.

Thereby, since the appropriate supplemental steering force (assistance torque) can be generated in the load portion in the steering mechanism unit 21 to always operate the steering wheel in a light steering force, it is possible to achieve a reduction in fatigue of an operator even at the manual mode time, for example. Even in a case of the working vehicle in which the automatic steering is made possible by the autonomous mode by adding an alternative function of the steering operation by an operator, the assistance torque is calculated based upon the target torque Ta for steering from the external control device (that is, the autonomous mode controller 14 and the external management station 19) and the steering load torque Tc to drive the electric motor device 34. Thereby, the supplemental steering force can be generated to cancel out the steering load torque Tc to realize the steering control device 20 that allows the automatic steering operation to smoothly follow up the target torque Ta for steering.

In addition, the steering mechanism unit 21 and the control section (steering controller 40) for acquiring the aforementioned two effects are in common. Therefore, the two functions of the operator assistance at the manual mode time and the automatic steering at the autonomous mode time can be realized while suppressing an increase in device costs to the minimum. In addition, for example, even during the traveling by the autonomous mode, the driving by the manual mode is made possible by an operation of the steering handle 32 by an operator who has got in a vehicle, and the manual steering can be performed as needed even in the middle of the autonomous travel.

Figure 11:
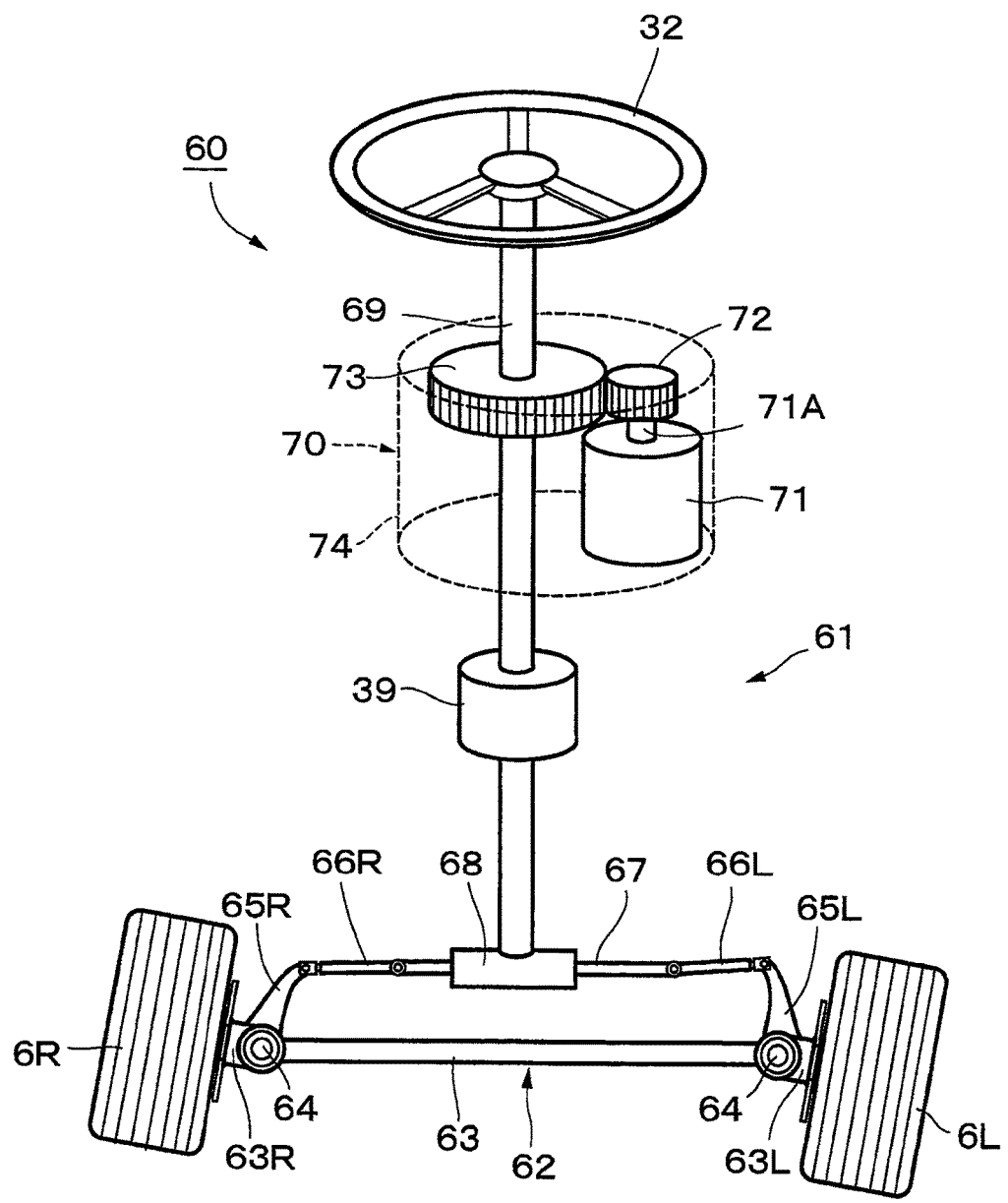
FIG. 11 is a configuration diagram showing a steering control device according to a second embodiment.

Next, FIG. 11 shows a second embodiment of the present invention. The present embodiment is characterized in that dynamic steering is performed by a driving force of an electric motor and a hydraulic force is not used in a steering mechanism unit in a steering control device, forming a power steering mechanism. It should be noted that in the second embodiment, components identical to those in the first embodiment are referred to as identical reference numerals, and an explanation thereof is omitted.

Here, a steering control device 60 (steering system) adopted in the second embodiment includes a mechanical steering mechanism unit 61 and the steering controller 40 as similar to that of the first embodiment. However, the steering mechanism (steering mechanism unit 61) in the steering control device 60 according to the second embodiment is configured to change a direction of steering wheels (front wheels 6L and 6R) by a driving force by an electric motor device 70 to be described later without using the hydraulic mechanism of the steering valve 31 described in the first embodiment, and the like. The steering mechanism unit 61 includes the steering handle 32 and the load torque sensor 39 as similar to those in the first embodiment, and a steering link mechanism 62, a steering column 69 and an electric motor device 70 to be described later.

The steering link mechanism 62 includes a link member 63 coupled to the vehicle body 2 between the left and right front wheels 6L and 6R, a pair of left and right spindles 63L, 63R that are attached on both of left and right ends of the link member 63 and rotatably support the front wheels 6L and 6R, a pair of left and right king pins 64, a pair of left and right knuckle arms 65L, 65R, a pair of left and right tie rods 66L, 66R, and a rack 67 and a gear case 68 to be described later. The steering link mechanism 62 is configured as substantially similar to the steering link mechanism 22 described in the first embodiment other than the left and right tie rods 66L, 66R, the rack 67, the gear case 68 and the like.

The rack 67 is formed to extend to both sides in the left-right direction from the inside of the tubular gear case 68, and the left and right tie rods 66L, 66R are rotatably pinned to both ends thereof. That is, the left and right tie rods 66L, 66R respectively are rotatably coupled between the left and right knuckle arms 65L, 65R and both ends of the rack 67. A pinion (not shown) meshed with the rack 67 is arranged in the tubular gear case 68, and the pinion is provided at the tip end (lower end) side of the steering column 69 to be integral therewith. That is, the rack 67 and the pinion forms part of a steering gear mechanism called a so-called rack and pinion to mechanically steer the steering wheels (front wheels 6L, 6R).

The electric motor device 70 and the load torque sensor 39 are provided in the middle of the steering column 69 as similar to that of the first embodiment. The electric motor device 70 is positioned between the steering handle 32 and the load torque sensor 39 to be arranged to be capable of applying a rotational force to the steering column 69. The electric motor device 70 includes an electric motor 71, a driving gear 72 provided on an output shaft 71A of the electric motor 71, and a driven gear 73 that is fixedly provided in the middle of the steering column 69 and is meshed with the driving gear 72. The driving gear 72 and the driven gear 73 form part of a reduction mechanism that reduces rotation of the electric motor 71 to be transmitted to the steering column 69.

The electric motor device 70, as shown in a dotted line, has a tubular case 74 that accommodates the electric motor 71, the driving gear 72 and the driven gear 73. The output shaft 71A of the electric motor 71 is arranged in the case 74 to extend in parallel to the steering column 69. As described in the first embodiment, the electric motor 71 and the driving gear 72 can be removed from the inside of the case 74. Here, the driving gear 72 and the driven gear 73 are configured using a spur gear. However, the driving gear and the driven gear may be configured using a bevel gear or the like. In this case, the output shaft 71A of the electric motor 71 may be arranged to be inclined obliquely to the steering column 69. In addition, instead of the driving gear 72 and the driven gear 73, for example, a reduction mechanism using a pulley, a belt, a chain and the like may be adopted. Further, the electric motor device may be configured by arranging a rotor of the electric motor to be coaxial with the steering column.

In the working vehicle represented by such a dump truck 1, when an operator operates the steering handle 32, the steering torque given to the steering handle 32 is transmitted from the pinion to the rack 67 in the gear case 68 through the steering column 69, and is converted into the left and right movements of the tie rods 66L, 66R from the rack 67 to convert the rotational movement into the straight movement. The left and right tie rods 66L, 66R are connected to the knuckle arms 65L, 65R rotatably attached on the link member 63, and the left and right movements of the tie rods 66L, 66R are converted into a steering rotational movement of the knuckle arms 65L, 65R. Due to these operations, directions of the spindles 63L, 63R fixed through the king pins 64 to the knuckle arms 65L, 65R and the left and right front wheels 6L, 6R rotatably attached on the spindles 63L, 63R change to realize the steering.

In this way, even in the second embodiment as configured above, the steering load torque Tc generated in the steering column 69 between the load portion of the steering mechanism unit 61 and the electric motor device 70 by the steering operation in the manual mode by the operator or by the steering operation by the target torque at the autonomous mode time is detected by the load torque sensor 39. In addition, the steering load torque calculating part 41 calculates a steering load torque based upon this detection value, and an assistance torque is calculated based upon the calculated torque value in the assistance torque calculating part 42, and a drive current necessary for generating the assistance torque is outputted from the inverter 43 to the electric motor 71 to drive the electric motor device 70, thus achieving the effect that is substantially similar to that of the first embodiment.

Particularly, the second embodiment is configured such that the hydraulic mechanism including the steering valve 31 as in the first embodiment is not used in the steering mechanism unit 61 in the steering control device 60 to change the direction of the steering wheels (front wheels 6L, 6R) with the driving force by the electric motor device 70. Therefore, the configuration of the steering mechanism unit 61 can be simplified to achieve the miniaturization and the light weight of the device. Further, the installation work and the like of the hydraulic pipe become unnecessary, making it possible to improve assembly workability.

It should be noted that the first embodiment is explained by taking a case where the steering load torque calculating part 41 in the steering controller 40 includes the mode switching part 44, the rotation direction determining part 45, the rotation start torque calculating part 46 and the torque switching part 47, as an example. However, the present invention is not limited thereto, but may include a steering load torque calculating section configured to calculate a steering load torque generated in the steering column 69 between the load portion of the steering mechanism unit 21 and the electric motor device 70 by the steering operation in the manual mode by the operator or by the steering operation by the target torque at the autonomous mode time by a torque value detected in the load torque sensor 39. This respect is likewise applied to the second embodiment.

Each of the above embodiments is explained by taking a case where the dump truck 1 is provided with the autonomous mode controller 14, as an example. However, the present invention is not limited thereto, but, for example, a working vehicle of a dump truck or the like may be configured to be able to perform only a manual operation without using the autonomous mode controller 14. Even in this case, by connecting the autonomous mode controller 14 to the traveling drive unit 12, it is possible to add the function of the autonomous mode later on.

Further, each of the above embodiments is explained by taking the dump truck 1 that is the large-sized working vehicle as a vehicle as an example, but the present invention is not limited thereto, but may be applied also to a steering control device in a medium-sized or a small-sized working vehicle, for example.

As described above, according to the embodiment of the present invention, the steering load torque calculating section includes a rotation direction determining section that detects to which rotation direction the output value of the load torque sensor has risen from a zero, a rotation start torque calculating section that calculates a rotation start torque of a preset magnitude in a direction of assisting in the steering column in the rotation direction based upon a start of rotation of the steering column detected by the rotation direction determining section and the rotation direction, and a torque switching section that outputs the rotation start torque to the assistance torque calculating section as the steering load torque instead of the output value of the load torque sensor during a period in which the rotation start torque is calculated by the rotation start torque calculating section, wherein the steering load torque calculating section outputs the rotation start torque of the preset magnitude to the assistance torque calculating section in the direction of assisting in the rotation direction when the start of the rotation is detected based upon the output value of the load torque sensor, and outputs the output value of the load torque sensor to the assistance torque calculating section as the steering load torque after the period.

In addition, the steering load torque calculating section includes a rotation direction determining section that detects to which rotation direction a target steering torque input from an exterior has risen from a zero, a rotation start torque calculating section that calculates a rotation start torque of a preset magnitude in a direction of assisting in the steering column in the rotation direction based upon a start of rotation of the steering column detected by the rotation direction determining section and the rotation direction, and a torque switching section that outputs the rotation start torque to the assistance torque calculating section as the steering load torque instead of the output value of the load torque sensor during a period in which the rotation start torque is calculated, wherein the steering load torque calculating section outputs the rotation start torque of the preset magnitude to the assistance torque calculating section in the direction of assisting in the rotation direction when the start of the rotation is detected based upon the target steering torque, and outputs the output value of the load torque sensor to the assistance torque calculating section as the steering load torque after the period.

Thereby, for example, at the time of causing the working vehicle to travel and perform a steering operation in the autonomous mode, the rotation start torque of the preset magnitude can be outputted in a direction of assisting in the steering column in the steering direction (rotation direction) by the rotation start torque calculating section, based upon the start of the rotation detected by the rotation direction determining section in the steering load torque calculating section and the rotation direction. Accordingly, it is possible to suppress a large load from being given to the electric motor device due to an influence of the so-called static frictional force at the steering start time.

DESCRIPTION OF REFERENCE NUMERALS

1: Dump truck (Working vehicle)
2: Vehicle body
6L, 6R: Front wheel
7L, 7R: Rear wheel
8L, 8R: Traveling motor
12: Traveling drive unit
13: Mode selecting switch
14: Autonomous mode controller (External control device)
19: Management station (External control device)
20, 60: Steering control device
21, 61: Steering mechanism unit (Steering mechanism)
22, 62: Steering link mechanism
27L, 27R: Steering cylinder
31: Steering valve
32: Steering handle
33, 69: Steering column
34, 70: Electric motor device
35, 71: Electric motor
39: Load torque sensor
40: Steering controller (Steering control section)
41: Steering load torque calculating part (Steering load torque calculating section)
42: Assistance torque calculating part (Assistance torque calculating section)
43: Inverter
44: Mode switching part
45: Rotation direction determining part (Rotation direction determining section)
46: Rotation start torque calculating part (Rotation start torque calculating section)
47: Torque switching part (Torque switching section)

The invention claimed is:

1. A steering control device for a working vehicle including:
    an electric motor device that generates an assistance torque to a steering column of a steering mechanism for a working vehicle, and
    an inverter that supplies a current for driving said electric motor device based upon a command value of said assistance torque, characterized in that:
    the steering control device for the working vehicle including:
    a load torque sensor that is attached between said electric motor device and a load portion of said steering mechanism to detect a load torque applied on a steering system;
    a steering load torque calculating section that calculates a steering load torque based upon an output value of said load torque sensor; and
    an assistance torque calculating section that adds the steering load torque outputted from said steering load torque calculating section and a target steering torque input from an exterior to calculate an assistance torque to command said electric motor device and command said inverter.

2. The steering control device for the working vehicle according to claim 1, wherein
    said steering load torque calculating section includes:
    a rotation direction determining section that detects to which rotation direction the output value of said load torque sensor has risen from a zero;
    a rotation start torque calculating section that calculates a rotation start torque of a preset magnitude in a direction of assisting in said steering column in said rotation direction based upon a start of rotation of said steering column detected by said rotation direction determining section and the rotation direction; and
    a torque switching section that outputs said rotation start torque to said assistance torque calculating section as said steering load torque instead of the output value of said load torque sensor during a period in which said rotation start torque is calculated by said rotation start torque calculating section, wherein
    said steering load torque calculating section outputs said rotation start torque of the preset magnitude to said assistance torque calculating section in the direction of assisting in said rotation direction when the start of said rotation is detected based upon the output value of said load torque sensor, and outputs the output value of said load torque sensor to said assistance torque calculating section as said steering load torque after said period.

3. The steering control device for the working vehicle according to claim 1, wherein
    said steering load torque calculating section includes:
    a rotation direction determining section that detects to which rotation direction said target steering torque input from an exterior has risen from a zero;
    a rotation start torque calculating section that calculates a rotation start torque of a preset magnitude in a direction of assisting in said steering column in said rotation direction based upon a start of rotation of said steering column detected by said rotation direction determining section and the rotation direction; and
    a torque switching section that outputs said rotation start torque to said assistance torque calculating section as said steering load torque instead of the output value of said load torque sensor during a period in which said rotation start torque is calculated by said rotation start torque calculating section, wherein said steering load torque calculating section outputs said rotation start torque of the preset magnitude to said assistance torque calculating section in the direction of assisting in said rotation direction when the start of said rotation is detected based upon said target steering torque, and outputs the output value of said load torque sensor to said assistance torque calculating section as said steering load torque after said period.

* * * * *